(12) United States Patent
Humphrey et al.

(10) Patent No.: US 7,478,286 B2
(45) Date of Patent: Jan. 13, 2009

(54) CIRCUIT AND METHOD OF DETECTING AND RESOLVING STUCK I2C BUSES

(75) Inventors: George P. Humphrey, Merrimack, NH (US); William Edward Martin, Bedford, NH (US)

(73) Assignee: Linear Technology Corporation, Milpitas, CA (US)

( * ) Notice: Subject to any disclaimer, the term of this patent is extended or adjusted under 35 U.S.C. 154(b) by 652 days.

(21) Appl. No.: 11/101,638

(22) Filed: Apr. 8, 2005

(65) Prior Publication Data

US 2006/0242348 A1    Oct. 26, 2006

(51) Int. Cl.
G06F 11/00 (2006.01)
(52) U.S. Cl. .......................................... 714/43; 714/56
(58) Field of Classification Search ................... 714/43, 714/44, 56; 710/48, 58, 65, 110, 260, 264
See application file for complete search history.

(56) References Cited

U.S. PATENT DOCUMENTS

| 4,154,978 | A  | * | 5/1979  | Tu ........................... 178/71.1 |
| 4,695,740 | A  | * | 9/1987  | Carter ........................ 326/86 |
| 5,864,456 | A  | * | 1/1999  | Connor ..................... 361/93.7 |
| 6,032,271 | A  | * | 2/2000  | Goodrum et al. ............. 714/56 |
| 6,725,320 | B1 | * | 4/2004  | Barenys et al. .............. 710/316 |
| 6,728,908 | B1 | * | 4/2004  | Fukuhara et al. ............. 714/48 |
| 6,769,078 | B2 | * | 7/2004  | Barenys et al. .............. 714/43 |
| 6,874,052 | B1 | * | 3/2005  | Delmonico ................. 710/305 |
| 6,889,345 | B2 | * | 5/2005  | Sicola et al. ................. 714/43 |
| 7,062,683 | B2 | * | 6/2006  | Warpenburg et al. .......... 714/43 |
| 7,069,476 | B1 | * | 6/2006  | Insley et al. ................... 714/43 |
| 7,085,863 | B2 | * | 8/2006  | Barenys et al. .............. 710/104 |
| 7,167,912 | B1 | * | 1/2007  | Dhingra ....................... 709/223 |
| 7,197,667 | B2 | * | 3/2007  | Bogenrieder et al. .......... 714/31 |
| 7,200,781 | B2 | * | 4/2007  | Mantey et al. ................ 714/53 |
| 7,281,169 | B2 | * | 10/2007 | Golasky et al. ............... 714/43 |
| 7,287,192 | B1 | * | 10/2007 | Engel .......................... 714/43 |
| 2002/0108076 | A1 | * | 8/2002  | Barenys et al. ............... 714/43 |
| 2002/0194548 | A1 | * | 12/2002 | Tetreault ...................... 714/43 |
| 2004/0036808 | A1 | * | 2/2004  | Lendaro ...................... 348/725 |
| 2004/0059852 | A1 |   | 3/2004  | Sun et al. |
| 2004/0267999 | A1 |   | 12/2004 | Larson et al. |
| 2005/0240829 | A1 | * | 10/2005 | Safford et al. ................. 714/43 |
| 2005/0262395 | A1 | * | 11/2005 | Yang et al. .................... 714/25 |

OTHER PUBLICATIONS

Phillips Semiconductors, I2C Bus specification, Jan. 2000,Version 2.1.*
European Search Report, issued in European Patent Application No. 06231816.2-2212, dated on Oct. 10, 2007.

* cited by examiner

*Primary Examiner*—Dieu-Minh Le
(74) *Attorney, Agent, or Firm*—McDermott Will & Emery LLP

(57) ABSTRACT

A integrated circuit (IC) implementation of a protection circuit detects and resolves a fault on a bus, such as a stuck-low condition on an I2C bus. The circuit includes logic that detects a fault condition caused by the slave device, e.g. when one or both lines are low for a period longer than a timeout value in the I2C example. Upon detecting the fault condition, the logic disconnects the slave device from the data line and the clock line, for example by activation of switches incorporated in the IC. This typically frees the bus for use by other devices. The logic may also send the slave device one or more clock signals to clear the fault and/or a stop bit when the fault clears to reset the data register in the slave device.

25 Claims, 3 Drawing Sheets

US 7,478,286 B2

CIRCUIT AND METHOD OF DETECTING AND RESOLVING STUCK I2C BUSES

TECHNICAL FIELD

The present subject matter relates to techniques and circuitry to resolve issues that cause an electronic bus to be stuck in an unusable state.

BACKGROUND

Electronic circuits and systems often communicate with each other via a communication link referred to as a "bus." A variety of bus architectures are well known. Simple buses uses as few as two active wires, although they may include additional wires for other functions. For example, an inter-integrated circuit (I2C) bus consists of two communication wires, a serial data line (SDA) and a serial clock line (SCL).

I2C buses are used to provide communications between two integrated circuits (ICs), for example, two or more ICs on a printed circuit board (PCB) or ICs on different PCBs. The I2C bus also may be used as a network link between electronic systems, for example in automation or control system applications. Architectures like the I2C bus are relatively easy to implement, however, there are problems. One common problem relates to situations in which one of the active lines of the bus becomes hung-up or stuck in a particular state that prevents further use of the bus.

An example of an I2C bus providing communications between an intelligent control device and one or more general purpose application oriented circuits may help to demonstrate the problem. In most such cases the intelligent control device is a microcontroller unit (or MCU), and the general purpose circuits are slave devices. Some examples of slave devices are temperature sensors, memories, system monitors and LED drivers. The I2C bus protocol involves bidirectional communication between the devices communicating. In a typical example, the MCU asserts the I2C bus, addresses the slave device and requests to make a read from its internal register. The slave device asserts the I2C bus with an acknowledge signal, and then proceeds to put data from its register on the I2C bus. The MCU clocks the slave device, to receive the data. The slave device puts a bit of data on the bus per clock pulse that it receives from the MCU.

A problem occurs when the slave becomes out of sync with the master device, the MCU in the example. The slave device with data to send is waiting for another clock pulse, but the MCU thinks it has already sent out enough clock pulses. In the I2C protocol, a device asserts the bus by pulling the data line low. Hence, in this example, if the out-of-sync slave device is holding the data line low, all further communications are prevented, because that line is low and can not be cleared by the device until it receives another clock pulse (which the MCU does not intend to send). The I2C bus therefore is stuck.

Current systems must provide protection for this type of fault. Typically, systems must incorporate hardware and software to be able to identify, isolate and fix stuck I2C buses. Discrete hardware for these solutions requires valuable PCB space and may require dedicated connector pins. Under software control, the hardware must disconnect each card containing one or more slave devices, one at a time, until the fault clears, hence identifying the faulty card. Then, the software controls the hardware to reconnect to the faulty card only and send out clock pulses to clear the device that has been holding the bus low. If successfully received, these clock pulses allow the device to output its data. However, during this time, other devices remain disconnected and cannot use the bus.

Some systems, after identifying the bad card, require the card to be physically removed from the system and reinserted. Another solution is a system power cycle or analog switches to disconnect the power from specific circuits on the I2C bus. A power cycle will reset the device which is holding the bus low.

These methods are not very efficient. Pulling out cards or power cycling requires a significant amount of time and human involvement. Discrete hardware and software solutions using circuits to disconnect each card, one at a time to isolate a fault, require a significant amount of circuitry, PCB space and dedicated connector pins. Also, these solutions often require considerable time, during which the bus cannot even be used by other operative devices, while attempts are made to clear the device that caused the fault.

A need exists for a more effective technique to automatically isolate and resolve a stuck bus line. Any solution should require relatively simple circuitry and be relatively easy and cheap to manufacture, e.g. due to low component count.

SUMMARY

A method for detecting and resolving a fault on a bus involves monitoring a data line and a clock line of the bus. The clock line carries clock signals from a first device to a second device, to enable the second device to apply data to the data line for communication to the first device. This technique also involves detecting a condition corresponding to a fault caused by the second device. If the condition is detected, the second device is disconnected from the data line and the clock line of the bus.

In the examples, the bus is an inter-integrated circuit (I2C) bus. Typically, the first device is a master, and the second device is one or more slave devices that communicate over the bus. The fault is a stuck-low condition on the bus; and the detection entails detecting occurrences of a state in which either or both of the lines of the bus are in a low condition. The exemplary technique assumes that an actual stuck-low fault has occurred on the I2C bus if the state persists for some set time period, that is to say when the lines of the bus (data and clock) have not both been high, concurrently, for the time period. In the examples, to clear the fault, a sequence of clock pulses sufficient in number to clear data awaiting transmission are sent to the slave device while the slave device is disconnected. Also, a stop bit may be sent to the slave device, e.g. to cause that device to reset when the fault is cleared.

A integrated circuit (IC) implementation of a protection circuit also is disclosed, for detecting and resolving a fault on a bus that provides communications between two devices. Logic of the protection circuit serves to monitor the data line and the clock line of the bus and detect occurrence of a condition corresponding to a fault caused by the second device, that is to say caused by a slave device in the examples. Upon detecting such a condition, the logic disconnects the second device from the data line and the clock line of the bus.

In the disclosed examples, the protection circuit includes terminals for connection to the data and clock lines of the bus and switches coupled to the terminals. The switches may be actuated to selectively provide and break connections for the second device (e.g. a slave device) to the data and clock lines of the bus.

In the I2C examples, the logic includes two comparators for comparing signals on the data line and the clock line to a reference. Typically, the comparators sense the states of internal clock and data lines that connect to the slave device and connect to the clock and data lines of the bus going to the master device when the switches are closed. A gate detects occurrence of the state that may represent the fault, in response to outputs of the first and second comparators. A timer, responsive to the gate output, detects when such an occurrence lasts longer than a set time value. In the I2C examples, the gate triggers the timer whenever a low line state (when either or both of the lines are low), and the timer times out when this state (no occurrence of both lines high) lasts longer than the value set in the timer. When the timer times out, it triggers opening of the switches, to disconnect the second device from the data line and the clock line of the bus.

Examples of the protection circuit may also transmit a signal to the second device while that device remains disconnected. For example, when the timer times out, it may trigger a pulse generator to send one or more clock signals to the second device, in an attempt to clear the stuck-low fault. Logic may also be provided to detect a later clearance of the fault condition and send a stop bit over the data line of the second device.

Although the protection circuit may be implemented in a standalone IC configuration, it also may be incorporated into other circuits or elements normally expected to be connected to the bus. Many I2C-based applications utilize a two-wire buffer circuit at the interface between the bus and a card containing one or more of the slave devices. In one example discussed in detail below, the protection circuit is incorporated into an IC containing the circuitry of a two-wire buffer, such as a bi-directional buffer for providing amplification of signals passing in opposite directions over the data line and the clock line of the bus.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

As discussed more below, the exemplary circuits detect a fault condition on the bus and disconnect the device or devices that may be causing the problem from the bus. The circuit may also provide one or more clock pulses to the device(s) to cause them to clear any data that may be awaiting transmission and/or a stop bit to the the reset the device(s), before reconnecting the device(s) to the bus.

Figure 1:
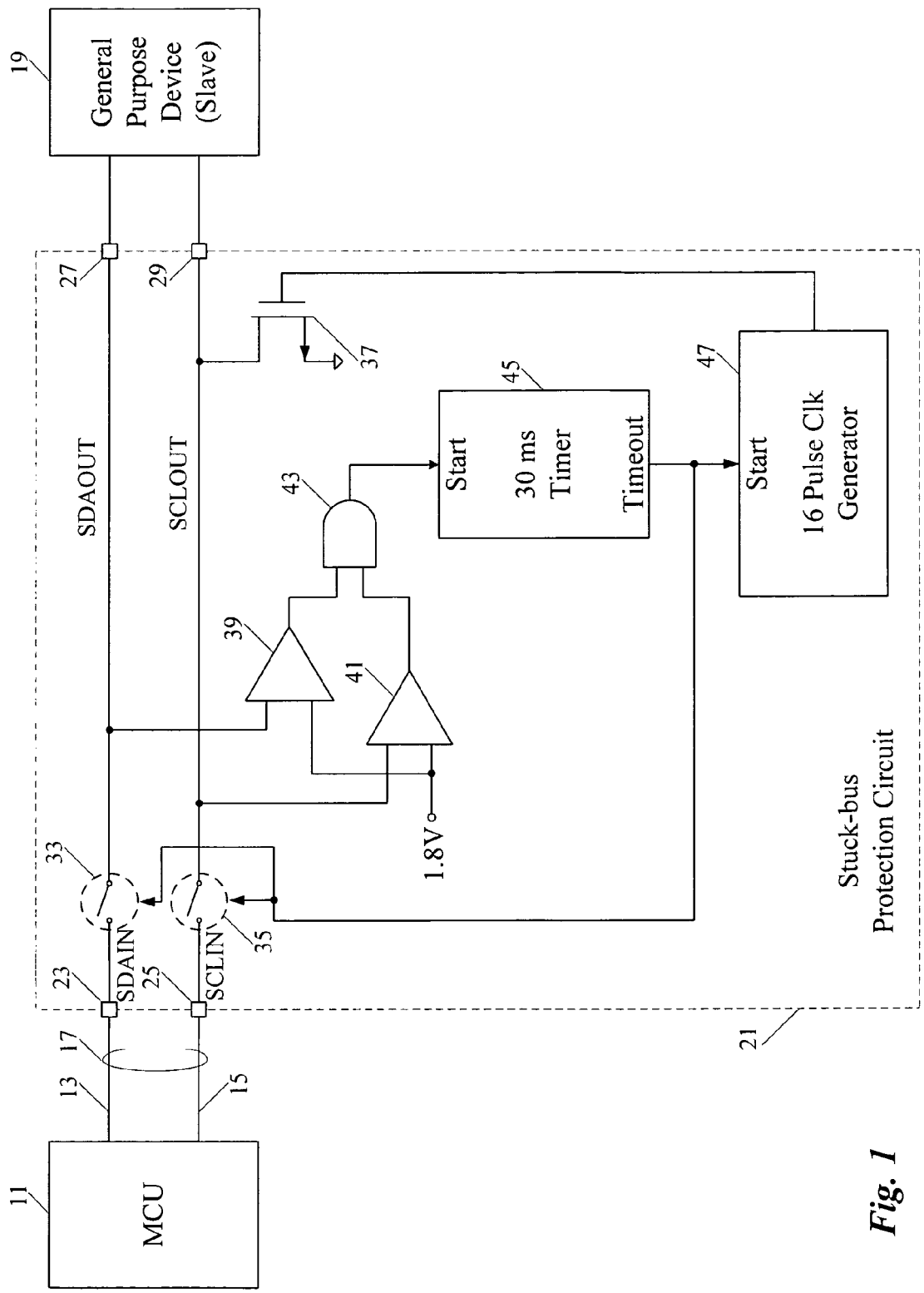
FIG. 1 is a functional block diagram of a simple system with an I2C type bus, and a first example of a protection circuit for detecting and resolving a stuck-low condition on a bus.

FIG. 1 illustrates a simple bus connection between a master device and a slave device, and a first example of a protection circuit to detect and resolve a stuck-bus fault caused by the slave device. In the example, a master control unit (MCU) 11 connects to the serial data line (SDA) 13 and the serial clock line (SCL) 15, of an inter-integrated circuit (I2C) bus 17. A general purpose circuit 19, such as a temperature sensor, memory, system monitor, LED driver or the like is a slave device that communications with the MCU 11 via the I2C bus 17. The slave device 19 connects to the I2C bus 17, through an IC implementation of a protection circuit 21. For descriptive purposes, only one slave device is shown, although there may be a number of slave devices behind the one protection circuit or connected to the bus in parallel through one or more similar protection circuits. The protection circuit 21 may be implemented as a standalone device as shown. As will be described later, the protection circuit may be incorporated in an IC together with other circuitry commonly used to provide a connection or coupling to the bus 17, such as a bus buffer often used to interface a card or the like to the bus.

In the example, the protector IC 21 is packaged for connection in the bus wires between the MCU 11 and the slave device 19. For that purpose, the IC package containing the protector 21 includes two pin connectors 23 and 25, providing electrical connections to the bus wires running to the MCU device 11. The pin connector 23 provides a connection for the SDA line 13 to the MCU 11; and the pin connector 25 provides a connection for the SCL line 15 to the MCU 11. For convenience, the connections through the pins 23 and 25 are referred to at times as "IN" connections (SDAIN and SCLIN).

Similarly, the protector 21 includes two pin connectors 27 and 29, providing electrical connections to the bus wires running to the slave device 19. The pin connector 27 provides a connection for the SDA line to the slave device 19; and the pin connector 29 provides a connection for the SCL line to the slave device 19. For convenience, the connections through the pins 27 and 29 are referred to at times as "OUT" connections (SDAOUT and SCLOUT).

The protection circuit 21 includes a switch for each of the monitored wires of the bus 17. In the two-wire bus example of FIG. 1, the IC type protection circuit 21 includes two switches 31 and 33 between the IN and OUT connections of the SDA and SCL lines through the respective sets of pin connectors. The switches may be relays, but in an initial implementation, the switches are semiconductor switches formed on the integrated circuit providing the protector (and possibly other elements, such as buffer circuitry).

The switch 33 is connected between the SDAIN connection to the SDA line 13 through the pin connector 23 and the SDAOUT connection to the slave device 19 through the pin connector 27. Selective actuation of the switch 33 selectively connects and interrupts the connection of the slave device to the SDA line 13 of the I2C bus 17.

Similarly, the switch 35 is connected between the SCLIN connection to the SCL line 15 through the pin connector 25 and the SCLOUT connection to the slave device 19 through the pin connector 29. Selective actuation of the switch 35 selectively connects and interrupts the connection of the slave device to the SCL line 15 of the I2C bus 17.

The protection circuit 21 includes a metal oxide semiconductor (MOS) transistor 37 having its source connected to ground and its drain connected to the SCLOUT node and through connector 29 to the lead running to the slave device 19. Pulse signals applied to the gate of the MOS transistor 37 produce corresponding clock pulse signals on the SCL lead to the slave device 19. Each pulsing of the transistor 37 pulls the SCLOUT node low for the duration of the pulse.

The protection circuit 21 includes logic for monitoring the SDA and SCL lines of the bus, at the internal SDAOUT and SCLOUT nodes, and for controlling the switches 33, 35 and applying pulses to the transistor 37 and thus sending clock signals to the slave device 19. Some or all of the logic could be implemented as programming in a processor, but in the example, the device uses discrete logic circuitry formed on the integrated circuit that incorporates the protector 21. In the example, the logic comprises comparators, a gate, a timer and a pulse sequence generator. Those skilled in the art will recognize other logic arrangements may be used to detect the stuck-low condition and/or other bus fault conditions that may be caused by the salve device(s) 19.

Hence, the protection circuit 21 includes two comparators 39, 41 for comparing the voltages on the bus lines to a reference voltage, e.g. 1.8V. The comparator 39 connects to the SDA line 13 through node SDAOUT and switch 33 when closed, whereas the comparator 41 connects to the SCL line 15 through node SCLOUT and switch 35 when closed. The outputs of the comparators 39 and 41 connect to the two inputs of an AND gate 43. Essentially, the comparators 39 and 41 monitor the SDAOUT and SCLOUT nodes of the circuit. If both internal lines for the bus connection to the slave device are high, the AND gate 43 provides a high signal at its output. However, each time either or both of SDAOUT and SCLOUT goes low, e.g. below 1.8V in our example, the output of the gate 43 also goes low.

In the illustrated circuit 21, the output of gate 43 drives the start or trigger input of a timer 45. The timer input is configured so that occurrence of a low signal on the 'Start' input activates the timer, the timer runs while that input stays low, and the timer 45 resets itself if the Start signal goes high again. Although other timer intervals may be used, the example uses a timer 45 that times out 30 ms after the transition to the low signal on the Start input triggers the timer if not reset before time runs out. The time value for timeout of the timer represents a threshold duration used to determine if a detected bus state corresponding to a potential fault persists long enough to represent an actual fault condition on the bus 17. Those skilled in the art will understand designs of such a timer and will recognize that other timing mechanisms may be used.

In the example, when the period (e.g. 30 ms) times out, the timer 45 opens the switches 33, 35 and triggers a pulse signal generator 47. Those skilled in the art will recognize that a variety of different circuits may be used to implement the pulse generator 47. When activated, the generator 47 outputs a sequence consisting of a set number of pulses, which are applied to the gate of the MOS transistor 37 to produce a corresponding number of clock pulse signals on the SDAOUT node and the lead going from pin 29 to the slave device 19. In this way, the circuit 21 can provide one or more clock pulses to a slave device 19 that is awaiting a new clock pulse to send its next bit of data and is holding the SDA line low, at a time when the MCU 11 has stopped sending clock pulses (thinking it already has sent enough clock pulses). In the example, the generator 47 is designed to generate a sequence or train of 16 pulses, which for most applications using an I2C bus is sufficient to allow the slave device 19 to effectively clear its output data register.

In normal operation, the switches 33 and 35 are closed, so that the protection circuit 21 establishes connections of SDAOUT and SCLOUT for the slave device 19 to SDAIN and SCLIN for the lines 13 and 15 of the bus 17 going to the MCU 11. The MCU 11 and the general purpose device 19 can communicate over the bus 17, in the normal manner.

The comparators 39 and 49 monitor the SDAOUT and SCLOUT nodes of the circuit. When SDAOUT or SCLOUT is low or both nodes are low, the output of AND gate 43 goes low to start the internal timer 45. The timer 45 is only reset when SDAOUT and SCLOUT are both high (when the output of gate 43 returns to a high state). If SDAOUT and SCLOUT do not both go high within 30 ms, the timer 45 times out. This indicates that the logic within protection circuit 21 has detected the fault condition, which in this example means that the logic has determined that the bus 17 is stuck low. In response to such a timeout, the timer opens switches 33 and 35, to break the connection between SDAIN and SDAOUT and to break the connection between SCLIN and SCLOUT. Breaking these connections isolates the problem device 19 from the bus 17. The MCU and any other devices on the bus may resume communication over the bus.

At this time, it is assumed that the MCU 11 and the device 19 it is communicating with are out of sync. The MCU 11 sent out all of the clock pulses necessary for a particular transaction, but the device 19 is still in the middle of the transaction. The device 19 is waiting for more clock pulses on SCL line 15 to finish putting its data on the SDA line 13 of the bus 17, and the last bit it put on the bus happened to be a low, hence device 19 holds the bus low until it gets more clocks (bus is stuck).

Now assume the timer 45 has timed out, and therefore it activates the pulse generator 47. With the switches open, the generator 47 starts pulsing the transistor 37 so as to automatically generate a sequence of 16 clock pulses at 8.5 KHz on SCLOUT. The slave device 19 receives the sequence of clock pulses via the lead connected to pin 29. The slave device 19 responds to the pulse(s) by outputting the rest of its data, although the data will not go to the MCU because the open switch 33 blocks or disconnects the path to the SDA bus line 13. For most I2C applications, 16 is enough clock cycles to clear the internal register on the device 19. The device could be cleared with one or any number of clocks (up to 16) depending on how the fault occurred. While the 16 clocks are being asserted on SCLOUT, the rest of the I2C bus is back to normal operation, not being influenced by the problem device. The fault is being cleared independently of the MCU. If the fault cannot be cleared, the bad circuit remains isolated from the system (by the open switches).

If SDAOUT and SCLOUT go high at the same time, the fault is cleared. Typically, this occurs when the slave device 19 de-asserts the low bit on its data line to SDAOUT and the clock signal applied through transistor 37 goes high on the internal SCL line SCLOUT. The comparators 39, 41 detect the concurrent high states, and the signal output from the AND gate 43 goes back to a high state. This resets the automatic clocking by the timer 45, and a connection is automatically enabled by restoring the switches 33 and 35 to their closed positions.

As noted, the protection circuit can be integrated with other components intended for connection to an I2C bus, and one protection circuit 21 may service a number of slave devices. To illustrate these points, it may be helpful to consider an example of such an application of the stuck-bus protection circuit.

Figure 2:
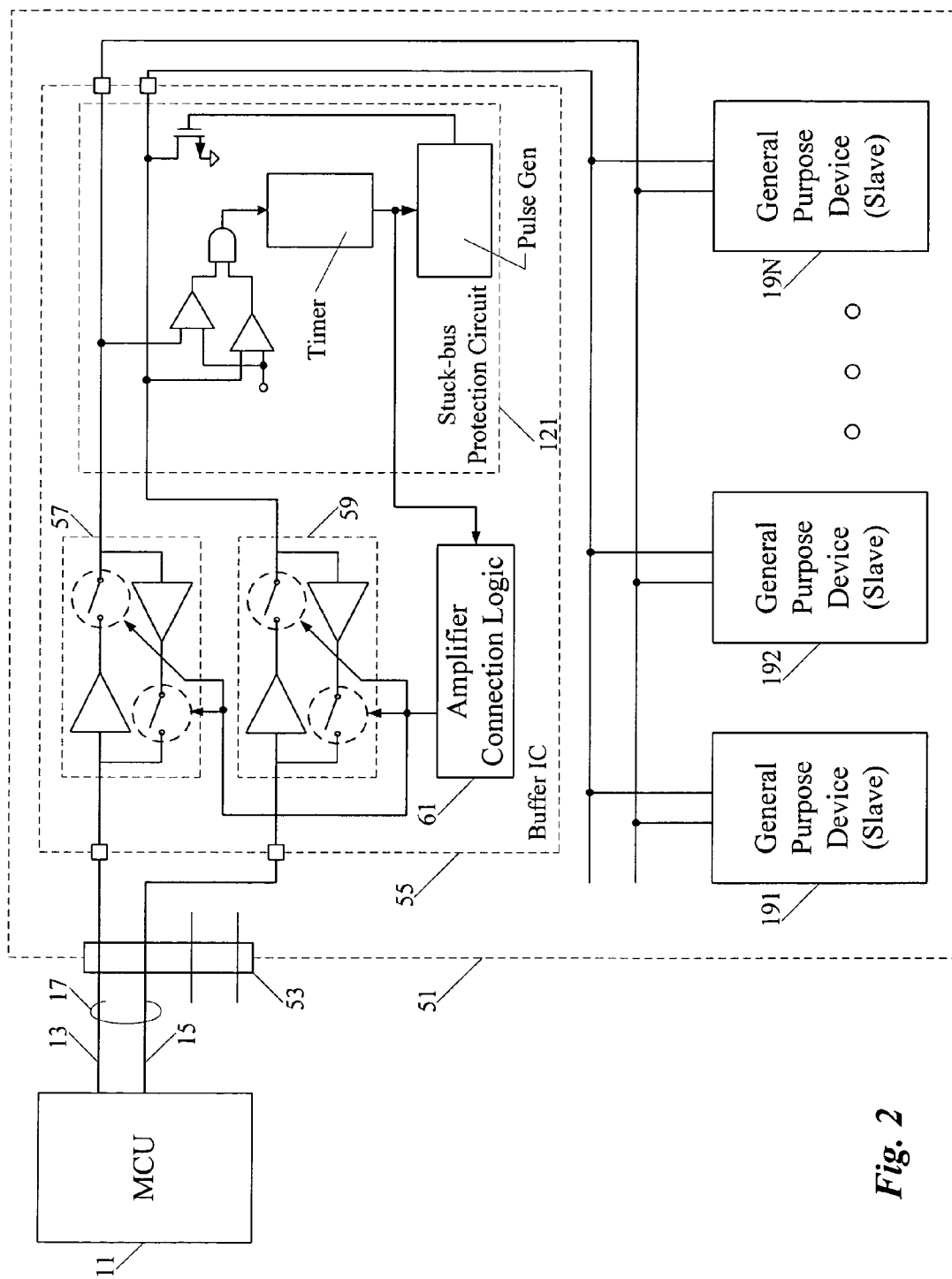
FIG. 2 is a functional block diagram of a system, wherein a protection circuit is incorporated into a integrated circuit containing a two-wire buffer, and the integrated circuit is an interface element on a card containing a number of slave devices.

In the example of FIG. 2, a number of slave devices 19I, 192 ... 19N are implemented on a card 51. Although only one card 51 is shown, for convenience, many applications will provide a number of such cards connected to the "backplane" of an electronic system. In a typical installation, the MCU 11 is the master element in the larger system implemented in a cabinet, and the card 51 includes a backplane card connector 53 for enabling connections of elements on the card to other system elements in the cabinet. Of note for purposes of this discussion, two of the pin connections of the backplane card connector 53 provide connections to/from the wires 13 and 15 of the I2C bus 17, for communications with the MCU 11. Any other cards in the system will have a similar connection in parallel to the wires 13 and 15 of the bus 17, although the slave devices on each such card will often differ in structure and functions.

In the illustrated example, the card 51 also includes an integrated circuit IC 55. The IC 55 includes a protection circuit 121 (generally similar to the circuit 21 discussed above relative to FIG. 1) as well as other circuitry. In an initial implementation, the other circuitry provides typical functions of a 2-wire bus buffer, represented generically by the two-way (bi-directional) amplifier circuits 57 and 59 and the amplifier connection logic 61. Of course, the precise arrangement of the elements of the protection circuit in relation to the amplifiers 57, 59, the logic 61 and other components (not shown) of the buffer IC 55 is instructional, only. Those skilled in the art will recognize that other components will be included and the integration of the protection circuit elements with those other components may take many forms.

Bus buffers of this type are known in which the bi-directional amplifiers includes switches, and logic is provided to control operation of those switches, to control connection of the buffer to the lines of the bus 17. Of particular note, the logic shown at 61 insures that a connection to the bus is not made until the connection will not disrupt use of the bus. In this example, it is possible to use the switches associated with the amplifiers 57 and 59 to perform the selective connection and disconnection functions. Hence, the logic 61 is responsive to the timer output, to cause the switches to disconnect the slave devices from the bus 17. When the timer is reset, the amplifier connection logic will reconnect the slave devices to the bus, at an appropriate time, e.g. when signaling to/from one or more of the slave devices to clear data and/or reset data register(s) thereof is complete and will not disrupt other communications on the bus 17.

A bus buffer of this general type (without the integrated protection circuit 121) has been used widely in systems that utilize I2C busses. Incorporating the protection circuit 121 into the two-wire buffer IC 55 does not require any increase in the size of the buffer IC over prior buffer designs. Hence, the footprint of the buffer on the printed circuit board (PCB) of card 51 need not change, and adding the protection circuit 121 to a system does not take any extra PCB space. The component count added by the incorporation of protection circuit 121 also is relatively low.

As in the embodiment 21 shown FIG. 1, the comparators monitor the data line 13 and the clock line 15 of the bus 17, when the switches are closed and the lines 13, 17 are connected to the internal lines SDAOUT and SCLOUT. The AND gate is responsive to the comparator outputs to detect occurrences of a state that may correspond to the fault, in the example, to a low state on one or both lines of the bus 17. The timer examines the length of time of each occurrence of the condition corresponding to the potential fault persists. An fault condition is detected if an occurrence of the state persists for a time period equal to or greater than the value of time required for the timer to time-out. In the example, if one or both lines are low (no occurrence of both lines high) for a period of 30 ms or longer, the timer times out and provides a trigger signal on its output.

When the signal from the timer indicates time out of the set interval, it causes the connection logic 61 to activate the switches in amplifiers 57 and 59 so as to break the connections to the bus 17, in a manner substantially similar to opening the switches 33 and 35 the earlier example. It also triggers the pulse generator. Hence, upon determining that an occurrence of the potential fault state lasts longer than the time value (of the timer), the protection circuit 121 disconnects the slave devices 19I to 19N from the data line and the clock line of the bus 17. At that time, the circuit also sends at least one clock signal to the slave devices, in an attempt to clear the fault. The timer is reset when both lines are high at the same time, indicating that the slave device causing the fault has cleared its fault condition. The amplifier connection logic 61 detects the reset of the timer, when the timeout line goes low. The logic 61 closes the switches in the amplifier circuits 57, 59 when such connection will not disrupt operations on the bus 17, typically when the signaling from protection circuit 121 to the salve device 19 is finished.

In an implementation such as that shown in FIG. 2, the protection circuit 121 detects the stuck-low type bus fault if any one or more of the slave devices 191, 192 ... 192N is out of sync with the MCU so as to hold the bus low, and the circuit 121 will open the bus connection for those slave devices and provide clock pulses to cause any device(s) waiting for more clock pulses to clear their respective send data registers. Of course, while the circuit is clearing the fault from the devices within the card 51, the MCU may resume communicating over the bus 17 with other cards (not shown) within the system.

In a system having multiple cards connected to the bus 17, each card will include a similar protection circuit, such as the circuit 121 incorporated into the buffer IC 51. When a slave in one card becomes stuck low, all of the protection circuits will disconnect from the bus 17. However, only the circuit 121 serving the device causing the fault will need to take time to clear the effected device. The other protection circuits can reset immediately to facilitate further communications while the faulty device remains disconnected.

For example, if there are four cards in the system and each has a similar protection circuit on its front end, when the bus 17 is stuck low, all four protection circuits detect the fault condition and disconnect from the stuck bus 17. The protection circuits in all four cards will detect the low bus state, timeout and disconnect, as discussed above. However, three of the protection circuits will automatically re-enable the bus connections to their cards immediately after disconnect, as the disconnect will clear the fault. The fourth card, that is to say the card with the problem device, will remain stuck following its disconnect from the bus and the protection circuit keeps the devices on that card isolated from the system bus 17. Then, the stuck slave device on that card will receive the automatic clocking until it is unstuck, or if the device cannot be fixed, it will remain isolated from bus by continued disconnection.

Figure 3:
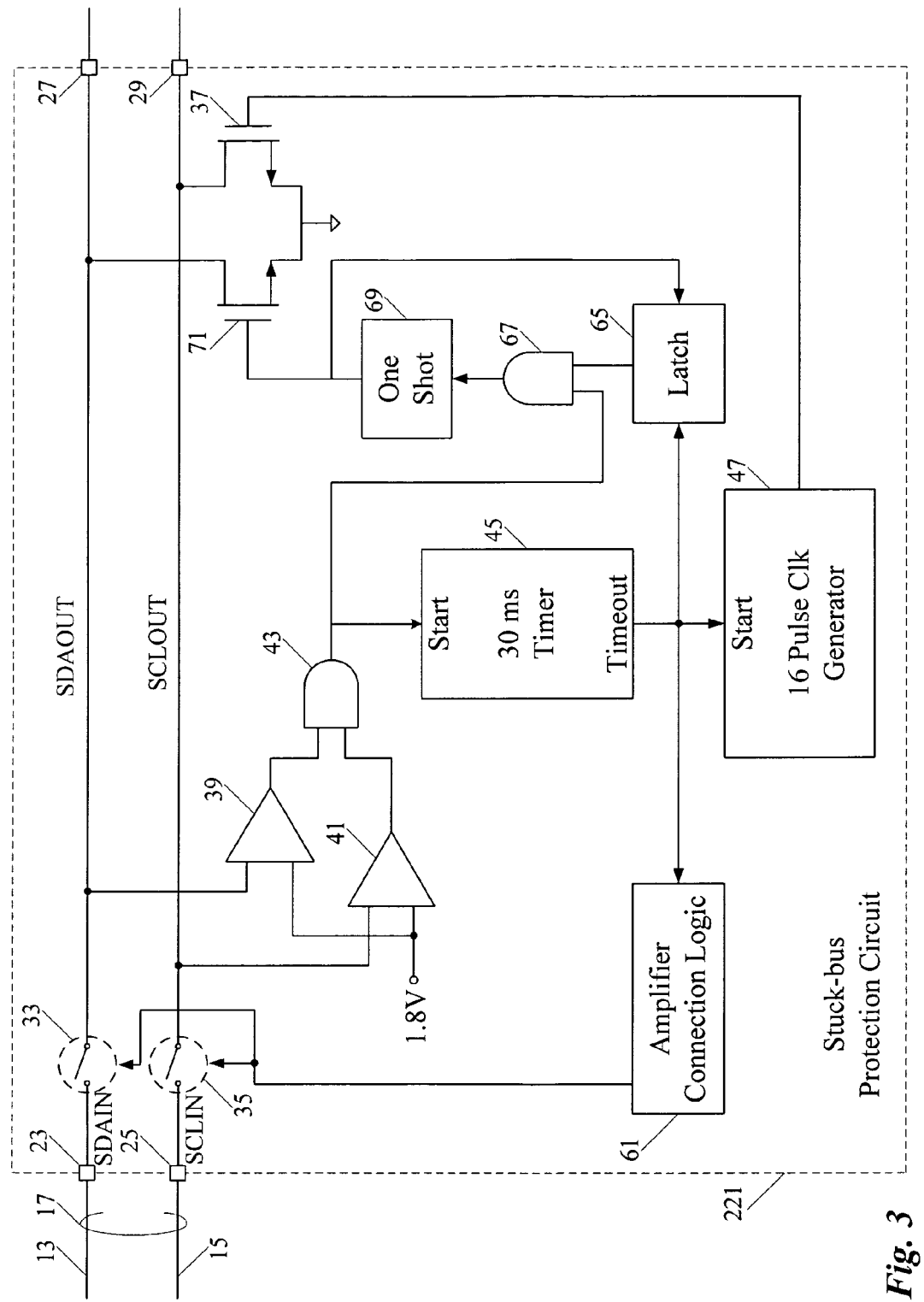
FIG. 3 is a functional block diagram of a another example of a protection circuit for detecting and resolving a stuck-low condition on a bus.

FIG. 3 shows another example 221 of an IC implementation of a protection circuit for application in the context of an I2C bus 17. Many of the elements of the protection circuit 221 are the same as in the circuits 21 and 121 and operate as described above. The protection circuit 221 also includes the amplification connection logic 61, which controls reconnection as outlined in the discussion of FIG. 2. The circuit 221 is shown using the switches 33 and 35 as in FIG. 1 for convenience, although the circuit may control switches associated with amplifiers of a buffer or the like as in the example of FIG. 2.

The protection circuit of FIG. 3 also incorporates elements to apply a pulse to the SDAOUT node for transmission to one or more slave devices, essentially as a stop bit sent when the fault clears, so as to cause each slave device attached to the circuit 221 to reset its data register. In the example, the additional elements include a latch circuit 65, another AND gate 67, a one shot circuit 69 and another MOS transistor 71, although those skilled in the art will recognize that other logic or circuit elements could be used.

The latch circuit 65 is set, so that its output goes high, in response to the timeout signal from the timer 45. The latch output stays high until the latch circuit 65 is reset. The AND gate 67 is responsive to the output of the gate 43 and the output of the latch circuit 65. When the output of the AND gate 67 transitions from low to high, the new high state on that output triggers the one shot circuit 69. The one shot circuit 69 is a circuit, of any known design, for generating a single pulse output when its input first goes high. Typically, the circuit design determines the duration of the output pulse.

The second MOS transistor 71 has its source connected to ground and its drain connected to the SDAOUT node and through connector 27 to the data lead running to the slave device 19 (see FIG. 1). Pulse signals applied to the gate of the MOS transistor 71 produce corresponding pulse signals on the SDA lead to the slave device 19. Each pulsing of the transistor 71 pulls the SDAOUT node low for the duration of the pulse.

The output of the one shot 69 connects to the gate of the second MOS transistor 71 and to the reset terminal of the latch circuit 65. In this way, when the one shot circuit 69 fires, the transistor 71 applies a single pulse to the SDAOUT node and through connector 27 to the data lead running to the slave device 19. Firing of the one shot circuit 69 also resets the latch circuit 65. With the latch reset and its output low, the output of the AND gate 67 also will stay low.

The circuit 221 of FIG. 3 operates as discussed above relative to FIGS. 1 and 2, to detect a state corresponding to a potential fault and detect a fault condition when that state persists for a time equal to or longer than the timeout value of the timer 45. Detection of the fault condition leads to disconnection of the slave device(s) by opening of the switches and to generation of the sequence of clock pulses on the SCLOUT node going to the slave device(s).

The AND gate 43 also provides an indication of when the fault is cleared. As noted, if both internal lines for the bus connection to the slave device are high at the same time, the AND gate 43 provides a high signal at its output. Assuming that the clock pulsing is successful in causing the out-of-sync slave device to clear its fault, the slave device will withdraw the low condition from its data line connection, allowing SDAOUT to go high. Initially, clearing at the salve device will occur in response to a low clock pulse level of one of the pulses applied to the slave device through SCLOUT. However, on the next transition of SCLOUT to high (rising edge at the end of the low clock pulse), both inputs of the AND gate 43 will be high at the same time, and the output of that gate 67 will go high.

Since output of the latch 65 is high (set previously when timer 45 timed out upon initial detection of the fault condition), both inputs of the AND gate 67 are now high. The resulting high output of gate 67 triggers the one shot circuit 69 and causes the transistor 71 to apply one low pulse to the SDAOUT node. In the I2C protocol, when clock is high, a rising edge on SDA represents a stop bit. Hence, when the low pulse from transistor 71 reaches the data connection at the slave device, the slave device interprets the pulse as a stop bit. A stop bit instructs the slave device to reset its data register. If the protection circuit serves multiple slave devices, as in the example of FIG. 2, the stop bit causes all of the connected slave devices to reset their data registers. However, because the logic 61 has not yet closed the switches 33 and 35, the stop bit does not reset any other devices connected to the bus 17.

Firing of the one shot circuit 69 also resets the latch circuit 65. As discussed earlier, if SDAOUT and SCLOUT go high at the same time, the fault is cleared, the comparators 39, 41 detect the high states, and the signal output from the AND gate 43 goes back to a high state to reset the timer 45. The reset of the timer 45 trips the connection logic 61, and when pulsing on SDAOUT and SCLOUT are complete, the logic 61 closes the switches 33 and 35 to reconnect to the lines 13 and 15 of the bus 17.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of detecting and resolving a fault on a bus for providing communications between first and second devices, comprising:
    monitoring a data line and a clock line of the bus, the clock line carrying clock signals from the first device to the second device to enable the second device to apply data to the data line for communication to the first device;
    based on the monitoring, detecting a condition corresponding to a fault caused by the second device;
    upon detecting the condition corresponding to the fault, automatically opening circuit connections of the second device to the data line and the clock line of the bus, to disconnect the second device from the bus; and
    sending a signal comprising at least one clock signal, over a clock connection to the second device, while the second device remains disconnected.

2. The method of claim 1, wherein the at least one clock signal comprises a sequence of clock pulses sufficient in number to clear data awaiting transmission from the second device.

3. The method of claim 1, wherein the step of detecting the condition corresponding to the fault comprises:
    detecting occurrence of a state that may correspond to the fault; and
    timing the occurrence of the state to determine if the state lasts longer than a time value.

4. The method of claim 3, wherein:
    if the fault is a stuck-low condition on the bus, then
    the step of detecting the occurrence of the state comprises detecting when either one or both of the data line and the clock line of the bus is in a low condition.

5. The method of claim 4, wherein the bus is an inter-integrated circuit (I2C) bus.

6. The method of claim 3, wherein the first device is a master, and the second device is a slave with respect to the master first device, at least for purposes of communications over the bus.

7. The method of claim 3, wherein the at least one clock signal comprises a sequence of clock pulses sufficient in number to clear data awaiting transmission from the second device.

8. The method of claim 7, wherein:
the time value is at least 30 ms; and
number of clock pulses is at least 16.

9. The method of claim 1, wherein the sending of at least one signal further comprises sending a stop bit over a data connection to the second device.

10. The method of claim 1, further comprising:
detecting a change in the condition, indicating resolution of the fault; and
in response to the detected change, automatically reconnecting the second device to the data line and the clock line of the bus.

11. A method of detecting and resolving a fault on a bus for providing communications between first and second devices, comprising:
monitoring a data line and a clock line of the bus, the clock line carrying clock signals from the first device to the second device to enable the second device to apply data to the data line for communication to the first device;
based on the monitoring, detecting a condition corresponding to a fault caused by the second device;
upon detecting the condition corresponding to the fault, automatically opening circuit connections of the second device to the data line and the clock line of the bus, to disconnect the second device from the bus;
detecting clearance of the fault; and
sending a signal comprising a stop bit over a data connection to the second device upon the detection of the clearance of the fault, while the second device remains disconnected.

12. The method of claim 11, wherein the step of detecting the condition corresponding to the fault comprises:
detecting occurrence of a state that may correspond to the fault; and
timing the occurrence of the state to determine if the state lasts longer than a time value.

13. The method of claim 12, wherein:
if the fault is a stuck-low condition on the bus, then
the step of detecting the occurrence of the state comprises detecting when either one or both of the data line and the clock line of the bus is in a low condition.

14. The method of claim 11, wherein the bus is an inter-integrated circuit (I2C) bus.

15. The method of claim 11, wherein the first device is a master, and the second device is a slave with respect to the master first device, at least for purposes of communications over the bus.

16. An integrated circuit, for detecting and resolving a fault on a bus providing communications between first and second devices, the bus comprising a data line and a clock line, the integrated circuit comprising:
terminals for connection to the data line and the clock line of the bus;
logic;
switches coupled to the terminals, for selectively breaking connections for the second device to the data line and the clock line of the bus in response to control by the logic;
the logic being configured for:
(a) monitoring the data line and the clock line of the bus and detecting an occurrence of a condition corresponding to a fault caused by the second device; and
(b) upon detecting occurrence of the condition, automatically controlling the switches to disconnect the second device from the data line and the clock line of the bus; and
circuitry for sending at least one clock signal to the second device while the second device remains disconnected.

17. The integrated circuit of claim 16, wherein the logic comprises:
a first comparator for comparing signals on the data line to a reference;
a second comparator for comparing signals on the clock line to a reference; and
a logic gate for detecting a state that may represent the fault, in response to outputs of the first and second comparators.

18. The integrated circuit of claim 17, wherein the logic further comprises a timer responsive to an output of the gate, for detecting the occurrence of the condition corresponding to the fault if the timer indicates that the detected state lasts longer than a time value.

19. The integrated circuit of claim 18, wherein the circuitry comprises a pulse generator responsive to time out of the timer, for sending said at least one clock signal to the second device when the timer indicates that the detected state lasts longer than the time value.

20. An integrated circuit, for detecting and resolving a fault on a bus providing communications between first and second devices, the bus comprising a data line and a clock line, the integrated circuit comprising:
terminals for connection to the data line and the clock line of the bus;
logic;
switches coupled to the terminals, for selectively breaking connections for the second device to the data line and the clock line of the bus in response to control by the logic;
the logic being configured for:
(a) monitoring the data line and the clock line of the bus and detecting an occurrence of a condition corresponding to a fault caused by the second device; and
(b) upon detecting occurrence of the condition, automatically controlling the switches to disconnect the second device from the data line and the clock line of the bus;
the logic comprising a first comparator for comparing signals on the data line to a reference, a second comparator for comparing signals on the clock line to a reference, and a logic gate for detecting a state that may represent the fault in response to outputs of the first and second comparators; and
circuitry responsive to output of the gate for detecting resolution of the fault and for sending a stop bit over a data connection to the second device upon the detection of resolution, while the second device remains disconnected.

21. An integrated circuit for interfacing a slave device to a bus comprising a data line and a clock line, the clock line carrying clock signals from a master device to the slave device to enable the slave device to apply data to the data line for communication to the master device, the circuit comprising:
a bi-directional buffer, for providing amplification of signals passing in opposite directions over the data line and the clock line of the bus;
terminals for connection to the data line and the clock line of the bus;
switches coupled to the terminals and associated with the bi-directional buffer, for selectively making and breaking connections for the slave device through the buffer to the data line and the clock line of the bus;

logic for:
(a) monitoring the data line and the clock line of the bus and detecting an occurrence of a condition corresponding to a fault caused by the slave device; and
(b) upon detecting occurrence of the condition, automatically controlling the switches to disconnect the slave device from the data line and the clock line of the bus; and
(c) circuitry responsive to the detection of the occurrence of the condition for sending at least clock one signal to the slave device while the slave device remains disconnected.

22. The integrated circuit of claim 21, wherein the logic of the protection circuit comprises:
a first comparator for comparing signals on the data line to a reference;
a second comparator for comparing signals on the clock line to a reference; and
a logic gate for detecting a state that may represent the fault, in response to outputs of the first and second comparators.

23. The integrated circuit of claim 22, wherein the logic of the protection circuit further comprises a timer responsive to an output of the gate, for detecting the occurrence of the condition corresponding to the fault if the timer indicates the detected state lasts longer than a time value.

24. The integrated circuit of claim 23, wherein the circuitry comprises a pulse generator responsive to time out of the timer, for sending at least one clock signal to the slave device when the timer indicates the detected state lasts longer than the time value.

25. An integrated circuit for interfacing a slave device to a bus comprising a data line and a clock line, the clock line carrying clock signals from a master device to the slave device to enable the slave device to apply data to the data line for communication to the master device, the circuit comprising:
a bi-directional buffer, for providing amplification of signals passing in opposite directions over the data line and the clock line of the bus;
terminals for connection to the data line and the clock line of the bus;
switches coupled to the terminals and associated with the bi-directional buffer, for selectively making and breaking connections for the slave device through the buffer to the data line and the clock line of the bus;

logic for:
(a) monitoring the data line and the clock line of the bus and detecting an occurrence of a condition corresponding to a fault caused by the slave device;
(b) upon detecting occurrence of the condition, automatically controlling the switches to disconnect the slave device from the data line and the clock line of the bus;
the logic comprising a first comparator for comparing signals on the data line to a reference a second comparator for comparing signals on the clock line to a reference, and a logic gate for detecting a state that may represent the fault in response to outputs of the first and second comparators; and
(c) circuitry responsive to output of the gate for detecting resolution of the fault and for sending a stop bit over a data connection to the slave device upon the detection of resolution, while the slave device remains disconnected.

* * * * *

UNITED STATES PATENT AND TRADEMARK OFFICE
CERTIFICATE OF CORRECTION

PATENT NO. : 7,478,286 B2  Page 1 of 1
APPLICATION NO. : 11/101638
DATED : January 13, 2009
INVENTOR(S) : George Humphrey et al.

It is certified that error appears in the above-identified patent and that said Letters Patent is hereby corrected as shown below:

In Column 5, Line 24, change "salve" to --slave--;

In Column 8, Line 15, change "19I" to --191--;

Line 25, change "salve" to --slave--;

Line 43, change "effected" to --affected--; and

In Column 9, Line 56, change "salve" to --slave--.

Signed and Sealed this

Fifth Day of May, 2009

JOHN DOLL
*Acting Director of the United States Patent and Trademark Office*